(12) United States Patent
Kawato et al.

(10) Patent No.: US 9,482,787 B2
(45) Date of Patent: Nov. 1, 2016

(54) POLYMERIZABLE COMPOSITION

(75) Inventors: Nobuo Kawato, Kurume (JP); Toshiya Hashimoto, Omuta (JP); Koya Kojima, Urayasu (JP)

(73) Assignee: MITSUI CHEMICALS, INC., Tokyo (JP)

( * ) Notice: Subject to any disclaimer, the term of this patent is extended or adjusted under 35 U.S.C. 154(b) by 196 days.

(21) Appl. No.: 14/123,863

(22) PCT Filed: Jun. 19, 2012

(86) PCT No.: PCT/JP2012/003990
§ 371 (c)(1),
(2), (4) Date: Dec. 4, 2013

(87) PCT Pub. No.: WO2012/176439
PCT Pub. Date: Dec. 27, 2012

(65) Prior Publication Data
US 2014/0107314 A1    Apr. 17, 2014

(30) Foreign Application Priority Data

Jun. 23, 2011 (JP) .................. 2011-139244

(51) Int. Cl.
| | |
|---|---|
| *G02B 1/04* | (2006.01) |
| *C08K 5/07* | (2006.01) |
| *C08G 18/38* | (2006.01) |
| *C08G 18/73* | (2006.01) |
| *C08G 18/75* | (2006.01) |
| *C08G 18/76* | (2006.01) |
| *C08K 5/37* | (2006.01) |
| *C08G 18/24* | (2006.01) |

(52) U.S. Cl.
CPC .............. *G02B 1/04* (2013.01); *C08G 18/242* (2013.01); *C08G 18/3876* (2013.01); *C08G 18/73* (2013.01); *C08G 18/755* (2013.01); *C08G 18/758* (2013.01); *C08G 18/7621* (2013.01); *C08G 18/7642* (2013.01); *C08G 18/7671* (2013.01); *C08K 5/07* (2013.01); *C08K 5/37* (2013.01); *G02B 1/041* (2013.01)

(58) Field of Classification Search
CPC .......... G02B 1/04; G02B 1/041; C08K 5/07; C08G 18/3876; C08G 18/73; C08G 18/755; C08G 18/758; C08G 18/7621; C08G 18/7642; C08G 18/7671
See application file for complete search history.

(56) References Cited

U.S. PATENT DOCUMENTS

| | | |
|---|---|---|
| 3,640,965 A | 2/1972 | Brode et al. |
| 4,753,825 A | 6/1988 | Linden et al. |
| 5,736,609 A | 4/1998 | Irizato et al. |
| 5,908,876 A | 6/1999 | Fujii et al. |
| 5,955,206 A | 9/1999 | Okazaki et al. |
| 6,019,915 A | 2/2000 | Fujii et al. |
| 6,225,021 B1 | 5/2001 | Widawski et al. |
| 2002/0022713 A1 | 2/2002 | Tanaka et al. |
| 2002/0032248 A1 | 3/2002 | Klinkenberg et al. |
| 2003/0181625 A1 | 9/2003 | Klinkenberg et al. |
| 2003/0199668 A1 | 10/2003 | Tanaka et al. |
| 2003/0212164 A1 | 11/2003 | Klinkenberg et al. |
| 2004/0122201 A1 | 6/2004 | Yoshimura et al. |
| 2004/0138401 A1 | 7/2004 | Bojkova et al. |
| 2004/0254258 A1 | 12/2004 | Horikoshi et al. |
| 2007/0149639 A1 | 6/2007 | Horikoshi et al. |
| 2008/0013042 A1 | 1/2008 | Habassi et al. |
| 2009/0225425 A1 | 9/2009 | Jang et al. |
| 2009/0258962 A1 | 10/2009 | Martz et al. |
| 2010/0063220 A1 | 3/2010 | Van Der Ven et al. |
| 2010/0209697 A1 | 8/2010 | Bowles et al. |
| 2010/0256271 A1 | 10/2010 | Hasegawa et al. |
| 2011/0212267 A1 | 9/2011 | Van Steenis et al. |
| 2012/0184640 A1 | 7/2012 | Kim et al. |

FOREIGN PATENT DOCUMENTS

| | | |
|---|---|---|
| CA | 2 870 118 A1 | 10/2013 |
| CN | 1317515 A | 10/2001 |
| EP | 0 742 244 A2 | 11/1996 |
| EP | 0 751 161 A2 | 1/1997 |
| EP | 0 802 208 A1 | 10/1997 |
| EP | 1 326 095 A1 | 7/2003 |
| EP | 1 524 289 A1 | 4/2005 |
| EP | 2 535 383 A2 | 12/2012 |
| JP | 60-199016 A | 10/1985 |
| JP | 63-046213 A | 2/1988 |
| JP | 3-49023 | * 3/1991 |
| JP | 3-084021 A | 4/1991 |
| JP | 8-003267 A | 1/1996 |
| JP | 9-059341 A | 3/1997 |
| JP | 9-110955 A | 4/1997 |
| JP | 10-273887 A | 10/1998 |
| JP | 2008-503635 A | 2/2008 |
| JP | 2010-185070 A | 8/2010 |
| JP | 2012-046711 A | 3/2012 |
| WO | WO 01/92363 A1 | 12/2001 |
| WO | WO 2004/060951 A1 | 7/2004 |
| WO | WO 2005/087829 A1 | 9/2005 |
| WO | WO 2006/005874 A1 | 1/2006 |
| WO | WO 2006/109765 A1 | 10/2006 |
| WO | WO 2007/020817 A1 | 2/2007 |
| WO | WO 2008/029994 A1 | 3/2008 |
| WO | WO 2008/061839 A1 | 5/2008 |
| WO | WO 2009/078129 A1 | 6/2009 |
| WO | WO 2009/126449 A2 | 10/2009 |
| WO | WO 2010/046333 A1 | 4/2010 |

OTHER PUBLICATIONS

Ciba DAROCUR 1173; Ciba Specialty Chemicals, Inc.; Edition 4.9.2001, Basle; pp. 1-3.*
Extended European Search Report dated Feb. 26, 2015, issued by the European Patent Office in the corresponding European Application No. 12802842.0. (13 pages).
International Search Report (PCT/ISA/210) mailed on Oct. 2, 2012, by the Japanese Patent Office as the International Searching Authority for International Application No. PCT/JP2012/003990.

* cited by examiner

*Primary Examiner* — Rabon Sergent
(74) *Attorney, Agent, or Firm* — Buchanan, Ingersoll & Rooney PC

(57) ABSTRACT

The polymerizable composition of the present invention contains a ketone compound including one or more carbonyl groups, at least one kind of isocyanate compounds and at least one kind of thiol compounds.

8 Claims, No Drawings

POLYMERIZABLE COMPOSITION

TECHNICAL FIELD

The present invention relates to a polymerizable composition that provides thiourethane resins, optical materials obtained using the composition, and a method for manufacturing the same.

BACKGROUND ART

Since plastic lenses are light, not easily cracked and can be dyed in comparison to inorganic lenses, plastic lenses have been rapidly distributed as optical elements such as eyeglass lenses and camera lenses. Hitherto, a variety of resins for lenses have been developed and used, and, among those resins, a typical example is a thiourethane resin obtained using a polymerizable composition including an isocyanate compound and a thiol compound (refer to Patent Documents 1 to 4).

In recent years, there has been a demand for fashionability of eyeglass lenses, and there has been an increasing demand for dyed lenses. When the dyeing properties of resins are excellent, since the dyeing temperature can be lowered, load on resins can be reduced, and the resins can be dyed within a short period of time, which leads to an improvement of productivity.

RELATED DOCUMENT

Patent Document

[Patent Document 1] Japanese Unexamined Patent Publication No. 60-199016
[Patent Document 2] Japanese Unexamined Patent Publication No. 63-046213
[Patent Document 3] Japanese Unexamined Patent Publication No. 08-003267
[Patent Document 4] Japanese Unexamined Patent Publication No. 09-110955
[Patent Document 5] Pamphlet of International Publication No. WO2005/087829
[Patent Document 6] Pamphlet of International Publication No. WO2006/109765
[Patent Document 7] Pamphlet of International Publication No. WO2007/020817

DISCLOSURE OF THE INVENTION

Polymerizable compositions to which an alcohol component is added have been proposed as thiourethane polymerizable compositions that can improve dyeing properties (refer to Patent Documents 5 to 7). However, the dyeing properties of obtained resins are improved, but the resins are inhomogeneously dyed in mottled or streaky patterns in some parts such that uneven dyeing density is observed, and there are cases in which resins are not homogeneously dyed.

An object of the present invention is to provide a polymerizable composition that can improve dyeing properties without causing uneven dyeing density in resins.

The inventors carried out thorough studies in order to achieve the above object. As a result, the inventors found that, when a ketone compound is added to a polymerizable composition including an isocyanate compound and a thiol compound, the polymerizable composition can improve the above object without causing any practical problem with the transparency and heat resistance of resins, and completed the present invention. In addition, when the polymerizable composition of the present invention is used, the mold release properties from molds are improved after the composition turns into a resin, and, furthermore, the mechanical properties of obtained plastic lenses are improved, that is, it was newly found that these properties are excellent in a balanced manner.

That is, the present invention is as follows.

[1] A polymerizable composition containing a ketone compound including one or more carbonyl groups; at least one kind of isocyanate compounds; and at least one kind of thiol compounds.

[2] The polymerizable composition according to [1], wherein the ketone compound is consisted of carbon atoms, hydrogen atoms and oxygen atoms.

[3] The polymerizable composition according to [1] or [2], wherein the ketone compound is represented by formula (1).

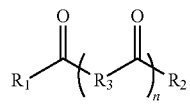

(1)

In the formula (1), each of $R_1$, $R_2$ and $R_3$ independently represents a linear, branched or cyclic aliphatic hydrocarbon group having 1 to 10 carbon atoms; $R_1$, $R_2$ and $R_3$ may bond together so as to configure a ring; n represents an integer of 0 or 1.

[4] The polymerizable composition according to any one of [1] to [3], wherein the ketone compound is one or more compounds selected from 4-methyl-2-pentanone, cyclohexanone, isophorone, tricyclo[5.2.1.0$^{2,6}$]decan-8-one, 2-adamantanone, camphor, 4,4'-bicyclohexanone and cyclohexanedione.

[5] The polymerizable composition according to any one of [1] to [3], wherein the ketone compound includes a 5-membered ring or 6-membered ring structure.

[6] The polymerizable composition according to [5], wherein the ketone compound includes a carbonyl group in the ring structures.

[7] The polymerizable composition according to any one of [1] to [6], wherein the ketone compound is included in 1 part by weight to 50 parts by weight with respect to a total of 100 parts by weight of the isocyanate compound and the thiol compound.

[8] The polymerizable composition according to any one of [1] to [7], wherein the isocyanate compound is one or more compounds selected from m-xylylene diisocyanate, 2,4-tolylene diisocyanate, 2,6-tolylene diisocyanate, 4,4'-diphenyl methane diisocyanate, 2,5-bis(isocyanatomethyl)-bicyclo[2.2.1]heptane, 2,6-bis(isocyanatomethyl)-bicyclo[2.2.1]heptane, bis(4-isocyanato cyclohexyl)methane, 1,3-bis(isocyanatomethyl)cyclohexane, 1,4-bis(isocyanatomethyl)cyclohexane, hexamethylene diisocyanate and isophorone diisocyanate, and the thiol compound is one or more compounds selected from pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis (mercaptomethylthio)ethyl)-1,3-dithietane, pentaerythritol tetrakis(2-mercaptoacetate) and ethylene glycol bis(3-mercaptopropionate).

[9] A molded material comprised of a thio urethane resin obtained by heating and curing the polymerizable composition according to any one of [1] to [8].

[10] An optical material comprised of the molded material according to [9].

[11] A plastic lens comprised of the optical material according to [10].

[12] A method for manufacturing optical materials including a step of cast-polymerizing the polymerizable composition according to any one of [1] to [8].

[13] The method for manufacturing optical materials according to [12] further including a step of dyeing a molded product obtained through the cast polymerization.

Since the polymerizable composition of the present invention is excellent in terms of dyeing properties, the occurrence of uneven dyeing density is suppressed, and it is possible to provide homogeneously-dyed resins or optical materials. Furthermore, optical materials obtained using the polymerizable composition of the present invention are excellent in terms of optical characteristics such as refractive index, mold release properties, transparency and heat resistance, and are also excellent in terms of a balance of the above characteristics.

DESCRIPTION OF EMBODIMENTS

Hereinafter, the present invention will be described in detail.

A polymerizable composition of the present invention contains a ketone compound including one or more carbonyl groups, at least one kind of isocyanate compounds and at least one kind of thiol compounds.

Hereinafter, the polymerizable composition of the present invention will be described using specific examples, but the present invention is not limited to the following exemplified compounds. In addition, the exemplified compounds may be used solely or in combination of a plurality of the compounds.

The ketone compound in the present invention is a compound having one or more carbonyl groups, in which all divalent functional groups represented by —C(=O)— bond with carbon atoms. Examples thereof include linear aliphatic ketone compounds, branched aliphatic ketone compounds, alicyclic ketone compounds having no carbonyl group in a ring structure, alicyclic ketone compounds having a carbonyl group in a ring structure and the like. In the present invention, a ketone compound consisted of only carbon atoms, hydrogen atoms and oxygen atoms is preferably used as the ketone compound.

Specifically, a ketone compound represented by formula (1) can be used.

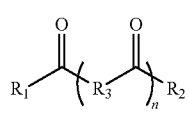

(1)

Examples of $R^1$, $R^2$ and $R^3$ in the formula (1) include organic residues derived from linear aliphatic hydrocarbons having 1 to 10 carbon atoms, organic residues derived from branched aliphatic hydrocarbons, organic residues derived from cyclic aliphatic hydrocarbons and the like. $R_1$, $R_2$ and $R_3$ may bond together so as to configure a ring. n represents an integer of 0 or 1.

Examples of the organic residues derived from linear aliphatic hydrocarbons include organic residues derived from methane, ethane, propane, butane, pentane, hexane, heptane, octane, nonane, decane and the like.

Examples of the organic residues derived from branched aliphatic hydrocarbons include organic residues derived from 2-methyl propane, 2-methyl butane, 2-methyl pentane, 3-methyl pentane, 3-ethyl pentane, 2-methyl hexane, 3-methyl hexane, 2-ethyl hexane, 3-ethyl hexane, 2-methyl heptane, 3-methyl heptane, 4-methyl heptane, 3-ethyl heptane, 4-ethyl heptane, 4-propyl heptane, 2-methyl octane, 3-methyl octane, 4-methyl octane, 3-ethyl octane, 4-ethyl octane, 2-methyl-1-butene, 3-methyl-1-butene, 2-methyl-2-butene, 2-methyl-butadiene, 2,3-dimethylbutadiene and the like.

Examples of the organic residues derived from cyclic aliphatic hydrocarbons include organic residues derived from cyclopentane, cyclopentene, cyclopentadiene, cyclohexane, 1,2-dimethyl cyclohexane, 1,3-dimethyl cyclohexane, 1,4-dimethyl cyclohexane, cyclohexene, 1,3-cyclohexadiene, 1,4-cyclohexadiene, 1,5,5-trimethyl cyclohexene, norbornane, 2,3-dimethyl norbornane, 2,5-dimethyl norbornane, 2,6-dimethyl norbornane, 1,7,7-trimethyl bicyclo[2.2.1]heptane, adamantane, tricyclo[5.2.1.0$^{2,6}$]decane and the like.

Examples of linear aliphatic ketone compounds include 2-hexanone, 2-heptanone, 4-heptanone, 2-octanone, 3-octanone, 4-octanone, 2-nonanone, 3-nonanone, 4-nonanone, 5-nonanone, 2-decanone, 3-decanone, 4-decanone, 5-decanone, 2,5-hexanedione, 2,6-heptanedione, 2,5-octanedione, 2,6-octanedione, 2,7-octanedione, 3,6-octanedione, 2,5-nonanedione, 2,8-nonanedione, 3,7-nonanedione, 2,5-decanedione, 3,7-decanedione and the like.

Examples of branched aliphatic ketone compounds include 3-methyl-2-pentanone, 4-methyl-2-pentanone, 2-methyl-3-pentanone, 3-methyl-2-hexanone, 4-methyl-2-hexanone, 2-methyl-3-hexanone, 5-methyl-3-hexanone, 3-methyl-2-heptanone, 4-methyl-2-heptanone, 2-methyl-3-heptanone, 4-methyl-3-heptanone, 5-methyl-3-heptanone, 6-methyl-3-heptanone, 2-methyl-4-heptanone, 3-methyl-4-heptanone, 2,6-dimethyl-4-heptanone, 3-ethyl-4-heptanone, 3-methyl-2-octanone, 3-methyl-4-octanone, phorone and the like.

Examples of alicyclic ketone compounds having no carbonyl group in a ring structure include 1-cyclohexyl ethanone, 1-cyclohexyl propanone, 1-cyclohexyl-2-methylpropane-1-one, dicyclohexyl methanone, 1-cyclopentyl ethanone, 1-cyclopentyl propanone, 1-cyclopentyl-2-methylpropane-1-one, dicyclopentyl methanone and the like.

Examples of alicyclic ketone compounds having a carbonyl group in a ring structure include cyclopentanone, 2-methyl cyclopentanone, 3-methyl cyclopentanone, 1,3-cyclopentanedione, cyclohexanone, 2-methyl cyclohexanone, 3-methyl cyclohexanone, 1,3-cyclohexanedione, 1,4-cyclohexanedione, isophorone, tricyclo[5.2.1.0$^{2,6}$]decan-8-one, 2-adamantanone, camphor, 4,4'-bicyclohexanone and the like.

The ketone compound in the present invention is preferably the branched aliphatic ketone compound or the alicyclic ketone compound having a carbonyl group in a ring structure.

In addition, among the above exemplified compounds, 2-hexanone, 2-heptanone, 4-heptanone, 2,6-dimethyl-4-heptanone, 2,5-hexanedione, phorone, 4-methyl-2-pentanone, cyclopentanone, cyclohexanone, methyl cyclohexanone, isophorone, tricyclo[5.2.1.0$^{2,6}$]decan-8-one, 2-adamantanone, camphor, 4,4'-bicyclohexanone and cyclohexanedione are preferable, and 4-methyl-2-pentanone, cyclohexanone, isophorone, tricyclo[5.2.1.0$^{2,6}$]decan-8-one, 2-adamantanone, camphor, 4,4'-bicyclocyclohexanone and cyclohexanedione are more preferable.

In the present invention, the ketone compound is included in 1 part by weight to 50 parts by weight, preferably 2 part by weight to 40 parts by weight, more preferably 5 part by weight to 30 parts by weight and particularly preferably 5 part by weight to 25 parts by weight with respect to a total of 100 parts by weight of the isocyanate compound and the thiol compound.

The isocyanate compound in the present invention refers to an aliphatic or aromatic compound including one or more isocyanate groups in a molecule. The isocyanate compound may include sulfur atoms and the like in the molecule, and may include dimers, trimmers and prepolymers.

Examples of the isocyanate compound in the present invention include aliphatic isocyanate compounds, alicyclic isocyanate compounds, aromatic isocyanate compounds, sulfur-containing aliphatic isocyanate compounds, sulfur-containing aromatic isocyanate compounds and the like.

Examples of the aliphatic isocyanate compounds include hexamethylene diisocyanate, 2,2-dimethylpentane diisocyanate, 2,2,4-trimethylhexane diisocyanate, 2,4,4-trimethyl hexamethylene diisocyanate, 1,6,11-undecatriisocyanate, 1,3,6-hexamethylene triisocyanate, 1,8-diisocyanate-4-isocyanate methyl octane, bis(isocyanate ethyl)carbonate, bis(isocyanate ethyl)ether and the like.

Examples of the alicyclic isocyanate compounds include isophorone diisocyanate, 1,2-bis(isocyanatomethyl)cyclohexane, 1,3-bis(isocyanatomethyl)cyclohexane, 1,4-bis(isocyanatomethyl)cyclohexane, bis(4-isocyanate cyclohexyl)methane, cyclohexane diisocyanate, methyl cyclohexane diisocyanate, 2,2-bis(4-isocyanate cyclohexyl)propane, 2,5-bis(isocyanatomethyl)-bicyclo[2,2,1]heptane, 2,6-bis(isocyanatomethyl)-bicyclo[2,2,1]heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane and the like.

Examples of the aromatic isocyanate compounds include o-xylylene diisocyanate, m-xylylene diisocyanate, p-xylylene diisocyanate, bis(isocyanate ethyl)benzene, bis(isocyanate propyl)benzene, bis(isocyanatomethyl)naphthalene, naphthalene diisocyanate, m-phenylene diisocyanate, p-phenylene diisocyanate, 2,4-tolylene diisocyanate, 2,6-tolylene diisocyanate, biphenyl diisocyanate, benzene triisocyanate and the like.

Examples of the sulfur-containing aliphatic isocyanate compounds include bis(isocyanate ethyl)sulfide, bis(isocyanate propyl) sulfide, bis(isocyanatomethyl)sulfone, bis(isocyanatomethyl)disulfide, bis(isocyanate propyl)disulfide, bis(isocyanate methylthio)methane, bis(isocyanate methylthio)ethane, bis(isocyanate ethylthio)methane, bis(isocyanate ethylthio)ethane, 1,5-diisocyanate-2-isocyanate methyl-3-thiapentane and the like.

Examples of the sulfur-containing aromatic isocyanate compounds include bis(3-isocyanate phenyl)sulfide, bis(4-isocyanate phenyl)sulfide, bis(3-isocyanate methylphenyl)sulfide, bis(4-isocyanate methylphenyl)sulfide, bis(3-isocyanate methylbenzyl)sulfide, bis(4-isocyanate methylbenzyl)sulfide, bis(3-isocyanate phenyl)disulfide, bis(4-isocyanate phenyl)disulfide, bis(3-isocyanate methylphenyl)disulfide, bis(4-isocyanate methylphenyl)disulfide and the like.

Among the above exemplified compounds, the aliphatic isocyanate compounds, the alicyclic isocyanate compounds and the aromatic isocyanate compounds are preferable, and m-xylylene diisocyanate, 2,4-tolylene diisocyanate, 2,6-tolylene diisocyanate, 4,4'-diphenylmethane diisocyanate, 2,5-bis(isocyanatomethyl)-bicyclo[2.2.1]heptane, 2,6-bis(isocyanatomethyl)-bicyclo[2.2.1]heptane, bis(4-isocyanate cyclohexyl)methane, 1,3-bis(isocyanatomethyl)cyclohexane, 1,4-bis(isocyanatomethyl)cyclohexane, hexamethylene diisocyanate and isophorone diisocyanate are more preferable.

Examples of the thiol compound in the present invention include aliphatic thiol compounds, aliphatic thiol compounds including an ester bond, aromatic thiol compounds and the like.

Examples of the aliphatic thiol compounds include methane dithiol, 1,2-ethane dithiol, 1,2-propane dithiol, 1,3-propane dithiol, 1,4-butane dithiol, 1,5-pentane dithiol, 1,6-hexane dithiol, 1,2-cyclohexane dithiol, 3,4-dimethoxy butane-1,2-dithiol, 2-methyl cyclohexane-2,3-dithiol, 1,2-dimercaptopropyl methyl ether, 2,3-dimercaptopropyl methyl ether, bis(2-mercaptoethyl)ether, tetrakis(mercaptomethyl)methane, bis(mercaptomethyl)sulfide, bis(mercaptomethyl)disulfide, bis(mercaptoethyl)sulfide, bis(mercaptoethyl)disulfide, bis(mercaptomethylthio)methane, bis(2-mercaptoethylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, tetrakis(mercaptomethylthiomethyl)methane, tetrakis(2-mercaptoethylthiomethyl)methane, bis(2,3-dimercaptopropyl)sulfide, 2,5-dimercapto-1,4-dithiane and the like.

Examples of the aliphatic thiol compounds including an ester bond include ethylene glycol bis(2-mercaptoacetate), ethylene glycol bis(3-mercaptopropionate), diethylene glycol(2-mercaptoacetate), diethylene glycol(3-mercaptopropionate), 2,3-dimercapto-1-propanol(3-mercaptopropionate), 3-mercapto-1,2-propanediolbis(2-mercaptoacetate), 3-mercapto-1,2-propanediolbis(3-mercaptopropionate), trimethyloipropane tris(2-mercaptoacetate), trimethylolpropane(3-mercaptopropionate), trimethylolethane tris(2-mercaptoacetate), trimethylolethane tris(3-mercaptopropionate), pentaerythritol tetrakis(2-mercaptoacetate), pentaerythritol (3-mercaptopropionate), glycerin tris(2-mercaptoacetate), glycerin tris(3-mercaptopropionate), 1,4-cyclohexanediol bis(2-mercaptoacetate), 1,4-cyclohexanediol bis(3-mercaptopropionate), hydroxymethyl sulfide bis(2-mercaptoacetate), hydroxymethyl sulfide bis(3-mercaptopropionate), hydroxyethyl sulfide (2-mercaptoacetate), hydroxyethyl sulfide (3-mercaptopropionate), hydroxymethyl disulfide (2-mercaptoacetate), hydroxymethyl disulfide (3-mercaptopropionate), thioglycolic acid bis(2-mercaptoethyl ester), thiodipropionic acid bis(2-mercaptoethyl ester) and the like.

Examples of the aromatic thiol compounds include 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4- bis(mercaptoethyl)benzene, 1,2,3-tri mercaptobenzene, 1,2,4-tri mercaptobenzene, 1,3,5-tri mercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 2,2'-dimercaptobiphenyl, 4,4'-dimercaptobiphenyl and the like.

Among the above exemplified compounds, the aliphatic thiol compounds and the aliphatic thiol compounds having an ester bond are preferable, and pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, pentaerythritol tetrakis(2-mercaptoacetate) and ethylene glycol bis(3-mercaptopropionate) are more preferable.

In addition, it is possible to add as much resin modifier to the polymerizable composition of the present invention as long as the effects of the present invention are not impaired in order to adjust various properties of an obtained resin, such as optical characteristics, impact resistance and specific gravity, and to adjust handling properties of a monomer.

Examples of the resin modifier include episulfide compounds, alcohol compounds, amine compounds, epoxy compounds, organic acids and anhydrides thereof, olefin compounds containing (meth)acrylate compounds and the like.

A molar ratio of the carbonyl groups in the ketone compound to mercapto groups in the thiol compound is preferably in a range of 0.5% to 50%, and more preferably in a range of 0.5% to 30%. An amount of the ketone compound used is appropriately determined depending on the kinds and amounts of additives used, such as a monomer being used, the resin modifier, a catalyst, an internal mold release agent and a UV absorbent, and the shape of a molded product.

Examples of a method for adding the ketone compound include a method for adding the ketone compound to each of the isocyanate compound, the thiol compound and the resin modifier, a method for adding the ketone to a mixture of the isocyanate compound and the thiol compound, a mixture of the isocyanate compound and the resin modifier or a mixture of the thiol compound and the resin modifier, a method for adding the ketone to a mixture of the isocyanate compound, the thiol compound and the resin modifier, and the like. Since preparation orders vary depending on the kinds and amounts of the isocyanate compound used, the thiol compound and the resin modifier which are to be used, the method for adding the ketone compound cannot be generally limited, and is appropriately selected in consideration of the solubility, operability, safety, convenience and the like of the ketone compound. In addition, when the ketone compound is mixed with the above compound, these compounds may be heated as necessary. A heating temperature is determined in consideration of the stability and safety of the mixture.

In the present invention, a molar ratio of the mercapto groups in the thiol compound to the isocyanate groups in the isocyanate compound is in a range of 0.8 to 1.2, preferably in a range of 0.85 to 1.15, and more preferably in a range of 0.9 to 1.1. In the above range, optical materials, particularly, resins preferably used as plastic lens materials for eyeglasses can be obtained.

A temperature at which the polymerizable composition is prepared by mixing a monomer being used, the catalyst, the internal mold release agent and other additives is generally 25° C. or lower. There are cases in which the temperature is preferably a lower temperature from the viewpoint of a pot life of the polymerizable composition. However, in a case in which the solubility of the catalyst, the internal mold release agent and the additives in the monomer are not favorable, it is also possible to dissolve the catalyst, the internal mold release agent and the additives in the monomer and the resin modifier by heating the catalyst, the internal mold release agent and the additive in advance.

In the present invention, a method for manufacturing thiourethane resins is not particularly limited, but preferable examples of the manufacturing method include cast polymerization. First, the polymerizable composition is injected into a mold held using a gasket, tape or the like. At this time, there are many cases in which a degassing treatment under reduced pressure, a filtration treatment under pressure or reduced pressure are preferably carried out as necessary depending on properties that obtained plastic lenses require.

Since polymerization conditions significantly vary depending on the kinds and amounts of the polymerizable composition and the catalyst used, the shape of the mold, and the like, the polymerization conditions are not limited; however, approximately, polymerization is carried out at a temperature of −50° C. to 150° C. for 1 hour to 50 hours. Depending on cases, the polymerizable composition is preferably held in a temperature range of 10° C. to 150° C. or slowly heated, and cured for 1 hour to 25 hours.

The thiourethane resin of the present invention may be subjected to an annealing treatment and the like as necessary. A treatment temperature is generally 50° C. to 150° C., preferably 90° C. to 140° C., and more preferably 100° C. to 130° C.

In the present invention, when the thiourethane resin is formed, depending on purposes, similarly to well-known forming methods, a variety of additives, such as an internal mold release agent, a chain extender, a cross linking agent, a light stabilizer, an ultraviolet absorbent, an antioxidant, a coloration inhibitor, an oil-soluble dye, a filler and an adhesion improver, may be added.

An acid phosphoric ester can be used as the internal mold release agent. Examples of the acid phosphoric ester include phosphoric monoester, phosphoric diester and the like, and the acid phosphoric ester can be used solely or in a mixture of two or more.

Meanwhile, since the thiourethane resin of the present invention is excellent in terms of mold release properties from molds, it is possible to decrease an amount of the internal mold release agent added.

Molded products having a variety of shapes can be obtained from the thiourethane resin of the present invention by changing molds during cast polymerization. The thiourethane resin of the present invention has a high refractive index and high transparency, and can be used as optical resins for a variety of uses such as plastic lenses, camera lenses, light emitting diodes (LED), prisms, optical fibers, information recording substrates, filters and light-emitting diodes. The thiourethane resin is particularly preferable as optical materials and optical elements such as plastic lenses, camera lenses and light emitting diodes. That is, the polymerizable composition of the present invention can be preferably used as a polymerizable composition for optical materials.

Plastic lenses for which the thiourethane resin of the present invention is used may be provided with a coating layer on a single surface or both surfaces as necessary, and then used. Examples of the coating layer include a primer layer, a hard coating layer, an antireflection film layer, an antifog coated film layer, an antifouling layer, a water-repellent layer and the like. It is possible to solely use each of the above coating layers, or to form a multilayered body of a plurality of coating layers and use the body. In a case in which the coating layers are formed on both surfaces, similar coating layers may be provided on the respective surfaces, or different coating layers may be provided.

In the coating layers, an ultraviolet absorbent for the purpose of protecting lenses or eyes from ultraviolet rays, infrared absorbent for the purpose of protecting eyes from infrared rays, a light stabilizer or an antioxidant for the purpose of improving weather resistance of lenses, a dye or pigment for the purpose of improving fashionability of lenses, further a photochromic dye or photochromic pigment, an antistatic agent and other well-known additives for enhancing performances of lenses may be jointly used respectively. For layers coated using coating, a variety of leveling agents may be used for the purpose of improving coatability.

The primer layer is generally formed between the hard coating layer described below and an optical lens. The primer layer is a coating layer having an object of improving adhesion between the hard coating layer formed on the primer layer and the lens, and, depending on cases, it is also possible to improve impact resistance. Any material can be used for the primer layer as long as the material is highly attachable to an obtained optical lens; however, in general, a primer composition mainly including a urethane-based resin, an epoxy-based resin, a polyester-based resin, a melanin-based resin, polyvinyl acetal or the like is used. For the primer composition, an appropriate solvent having no influence on lenses may be used for the purpose of adjusting a viscosity of the composition. It is needless to say that the primer composition may be used without a solvent.

The primer layer can be formed using any one of a coating method and a dry method. In a case in which the coating method is used, the primer layer is formed by coating the composition on a lens using a well-known coating method, such as spin coating or dip coating, and then solidifying the coated composition. In a case in which the dry method is carried out, the primer layer is formed using a well-known dry method such as a CVD method or a vacuum deposition method. When the primer layer is formed, pretreatments, such as an alkali treatment, a plasma treatment and an ultraviolet treatment, may be carried out on surfaces of a lens as necessary for the purpose of improving adhesion.

The hard coating layer is a coating layer for the purpose of supplying functions of abrasion resistance, wear resistance, moisture resistance, warm water resistance, thermal resistance, weather resistance and the like to the surfaces of a lens.

A hard coating composition including at least one kinds of fine particles comprised of a curable organic silicon compound and fine particles of one or more oxides of elements selected from an element group of Si, Al, Sn, Sb, Ta, Ce, La, Fe, Zn, W, Zr, In and Ti and/or a composite oxide of two or more elements selected from the above element group is generally used to form the hard coating layer.

The hard coating composition preferably includes at least any one of amines, amino acids, metal acetylacetonate complexes, organic acid metallic salts, perchloric acids, salts of perchloric acids, acids, metallic chlorides and polyfunctional epoxy compounds. For the hard coating composition, an appropriate solvent having no influence on lenses may be used, or the composition may be used without a solvent.

The hard coating layer is generally formed by coating the hard coating composition using a well-known coating method, such as spin coating or dip coating, and then curing the composition. Examples of a curing method include a curing method in which thermal curing or radiation of energy rays, such as ultraviolet rays or visible light rays, is used. A refractive index of the hard coating layer is preferably within a range of a difference of ±0.1 from the refractive index of the lens in order to suppress the occurrence of interference fringe.

The antireflection layer is generally formed on the hard coating layer as necessary. Examples of the antireflection layer include inorganic antireflection layers and organic antireflection layers. The inorganic antireflection layers are formed by a dry method such as a vacuum deposition method, a sputtering method, an ion plating method, an ion beam assisting method or a CVD method using an inorganic oxide, such as $SiO_2$ or $TiO_2$. The organic antireflection layers are formed by a wet method using a composition including an organic silicon compound and hollow silica-based fine particles.

One antireflection layer or multiple antireflection layers may be provided, and, in a case in which one antireflection layer is used, the refractive index of the antireflection layer is preferably smaller than the refractive index of the hard coating layer by at least 0.1 or more. In order to effectively develop an antireflection function, it is preferable to form multiple antireflection films, and, in this case, films having a low refractive index and films having a high refractive index are alternately stacked. Even in this case, a difference in the refractive index between the films having a low refractive index and the films having a high refractive index is preferably 0.1 or more. Examples of the films having a high refractive index include films of ZnO film, $TiO_2$ film, $CeO_2$ film, $Sb_2O_5$ film, $SnO_2$ film, $ZrO_2$ film, $Ta_2O_5$ film and the like, and examples of the films having a low refractive index include $SiO_2$ films and the like.

The antifog coated film layer, the antifouling layer and the water-repellent layer are formed on the antireflection film layer as necessary. Regarding a method for forming the antifog coated layer, the antifouling layer and the water-repellent layer, treatment methods, treatment materials and the like are not particularly limited as long as no adverse influences are brought to the antireflection function, and well-known antifog coating treatment method, antifouling treatment method, water repellent treatment method and materials can be used. Examples of the antifog coating and antifouling treatment methods include a method in which the surface is covered with a surfactant, a method in which a hydrophilic film is added to the surface so as to provide water absorbability, a method in which the surface is coated with fine irregularity so as to enhance water absorbability, a method in which a photocatalytic activity is used so as to provide water absorbability, a method in which a super water repellent treatment is carried out so as to prevent attachment of water droplets, and the like. In addition, examples of the water repellent treatment method include a method in which a water-repellency-provided layer is formed using a fluorine-containing silane compound or the like by deposition or sputtering, a method in which a fluorine-containing silane compound is dissolved in a solvent and then coated so as to form a water-repellency-provided layer, and the like.

Plastic lenses for which the thiourethane resin of the present invention is used may be dyed using a dye for the purpose of supplying fashionability, photochromic properties and the like, and then used. Lenses can be dyed using a well-known dyeing method, and, in general, dyed using the following method.

Generally, a lens fabric prepared on a predetermined optical surface is immersed in a dyeing solution in which a pigment to be used is dissolved or homogeneously dispersed (dyeing step), then, the lens is heated as necessary so as to fix the pigment (annealing-after-dyeing step). The dye used in the dyeing step is not particularly limited as long as the pigment is a well-known pigment, and, generally, an oil-soluble dye or dispersion dye is used. The solvent used in the dyeing step is not particularly limited as long as the solvent can dissolve or homogeneously disperse the pigment to be used. In the dyeing step, a surfactant for dispersing the pigment in the dyeing solution or a carrier that accelerates dyeing may be added as necessary. In the dyeing step, a pigment and a surfactant which is added as necessary are dispersed in water or a mixture of water and an organic solvent so as to prepare a dyeing bath, an optical lens is immersed in the dyeing bath, and dyed at a predetermined temperature for a predetermined period. The dyeing temperature and period vary depending on a desired dyeing concentration; however, in general, are preferably at 120° C. or lower for approximately several minutes to several tens of hours, and the dyeing concentration of the dyeing bath is 0.01 weight % to 10 weight %. In addition, in a case in which dyeing is difficult, dyeing may be carried out under pressurization. The annealing-after-dyeing step which is carried out as necessary is a step in which a heating treatment is carried out on a dyed lens fabric. In the heating treatment, water remaining on the surface of the lens fabric dyed in the dyeing step is removed using a solvent or the like, or the solvent is dried using wind, and then the lens fabric is held in a furnace, such as an infrared heating furnace under the atmosphere or a resistance heating furnace, for a predetermined period. In the annealing-after-dyeing step, bleaching of the dyed lens fabric is prevented (bleaching-prevention treatment), and moisture which has intruded into the lens fabric during dyeing is removed.

EXAMPLES

Hereinafter, the present invention will be specifically described based on examples, but the present invention is not limited thereto. In resin performance tests, refractive indexes, Abbe numbers, specific gravities, mold release properties, transparency, thermal resistance, dyeing properties, dyeing uniformity were evaluated using the following methods.

The refractive indexes (ne) and the Abbe numbers (ve) were measured at 20° C. using a Pulfrich refractometer.

The specific gravities were measured using an Archimedes method.

Mold release properties: When a molded product was released from a mold, if the molded product was not released from the mold or partially cracked, or the mold was broken, this product was evaluated to be "X" (poor mold release properties), and, if such things did not occur, this product was evaluated to be "O" (favorable mold release properties).

Transparency: An obtained the molded product comprised of resin was irradiated using a projector in a dark place, and the cloudiness, the presence of non-transparent materials and the elution of sticky components from tape were visually determined. Products for which the cloudiness, the presence of non-transparent materials and the elution from tape were not confirmed were evaluated to be "O" (transparent), and products for which such things were confirmed were evaluated to be "X" (not transparent).

Thermal resistance: The glass transition temperature was measured using a TMA penetration method (50 g of load, 0.5 mmφ at the tip of a pin, temperature-rise rate of 10° C./min). When the glass transition temperature was 90° C. or higher, products were evaluated to be "0" (thermally resistant), and, when the glass transition temperature was 90° C. or lower, products were evaluated to be "X" (not thermally resistant).

Dyeing properties: "FSP Red E-A" (1.0 g, manufactured by Futaba Sangyo Co., Ltd.), "FSP Yellow P-E" (1.0 g, manufactured by Futaba Sangyo Co., Ltd.), "FSP Blue AUL-S" (2.0 g, manufactured by Futaba Sangyo Co., Ltd.), "NICCA SUNSOLT #7000" (4.0 g, manufactured by Nicca Chemical Co., Ltd.) and "DK-CN" (4.0 g, manufactured by Daiwa Chemical Industry Co., Ltd.) were added to pure water (2986 g) so as to adjust a dye dispersion solution. The fluid was heated at 90° C., a 9 mm-thick molded product specimen was immersed at 90° C. for 5 minutes to dye. The transmittance (% T) of the dyed molded product specimen at a wavelength of 565 nm was measured. When the transmittance after the dyeing was 40% or less, products were evaluated to be "O" (favorable dyeing properties). When the transmittance after the dyeing was 60% or more, products were evaluated to be "X" (poor).

Dyeing uniformity: A molded product having a center thickness of 1 mm and a diameter of 80 mm was dyed using the above dyeing method, and the appearance was visually checked. When the molded product was homogeneously dyed, products were evaluated to be "O" (without uneven dyeing density), and, when the molded product was observed to be inhomogeneously dyed in mottled or streaky patterns in some parts, products were evaluated to be "X" (with uneven dyeing density).

Stiffness: Three-point bending tests were carried out under a constant crosshead speed condition (1.2 mm/min) using an autograph (series No. AGS-J) manufactured by Shimadzu Corporation. As values computed using the following formula based on obtained values increases, the stiffness was determined to be superior.

$$(L^3 \times F)/(4bh^3 \times s)$$

F: maximum point stress (N/mm$^2$), s: stroke (mm), L: distance between supporting points (mm), b: test specimen width (mm), h: test specimen thickness (mm)

Example 1

A mixture (43.3 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (51.0 g), cyclohexanone (5.7 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 43, a specific gravity of 1.29 and a thermal resistance of 90° C. or higher, which indicated that it was preferable as a transparent resin for optical materials. The obtained molded product was dyed, and it was confirmed that the transmittance after dyeing at 565 nm was 38% T so that the dyeing properties were favorable, and the molded product was homogeneously dyed without uneven dyeing density. In addition, a three-point bending test was carried out on the obtained molded product, and the stiffness was 2340 N/mm$^2$. From comparison with following Comparative Example 1, it was confirmed that addition of a ketone compound improved the value by 15%. The evaluation results were described in [Table 1].

Example 2

A mixture (43.6 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (51.4 g), methyl isobutyl ketone (5.0 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 43, a specific gravity of 1.29 and a thermal resistance of 90° C. or higher, which indicated that the composition was preferable as a transparent resin for optical materials. The obtained molded product was dyed, and it was confirmed that the transmittance after dyeing at 565 nm was 40% T so that the dyeing properties were favorable, and the molded product was homogeneously dyed without uneven dyeing density. The evaluation results were described in [Table 1].

Example 3

A mixture (43.2 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (51.0 g), isophorone (5.8 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 41, a specific gravity of 1.28 and a thermal resistance of 90° C. or higher, which indicated that the composition was preferable as a transparent resin for optical materials. The obtained molded product was dyed, and it was confirmed that the transmittance after dyeing at 565 nm was 38% T so that the dyeing properties were favorable, and the molded product was homogeneously dyed without uneven dyeing density. The evaluation results were described in [Table 1].

Example 4

A mixture (42.0 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (49.5 g), tricyclo[5.2.1.0$^{2,6}$]decan-8-one (8.6 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.57, an Abbe number (ve) of 43, a specific gravity of 1.29 and a thermal resistance of 90° C. or higher, which indicated that the composition was preferable as a transparent resin for optical materials. The obtained molded product was dyed, and it was confirmed that the transmittance after dyeing at 565 nm was 31% T so that the dyeing properties were favorable, and the molded product was homogeneously dyed without uneven dyeing density. The evaluation results were described in [Table 1].

Example 5

A mixture (40.5 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (47.7 g), 2-adamantanone (11.8 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 43, a specific gravity of 1.28 and a thermal resistance of 90° C. or higher, which indicated that the composition was preferable as a transparent resin for optical materials. The obtained molded product was dyed, and it was confirmed that the transmittance after dyeing at 565 nm was 31% T so that the dyeing properties were favorable, and the molded product was homogeneously dyed without uneven dyeing density. The evaluation results were described in [Table 1].

Example 6

A mixture (39.3 g) of 2,5-bis(isocyanatomethyl)-bicyclo [2.2.1]heptane and 2,6-bis(isocyanatomethyl)-bicyclo [2.2.1]heptane, pentaerythritol tetrakis(3-mercaptopropionate) (46.3 g), camphor (14.5 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 44, a specific gravity of 1.25 and a thermal resistance of 90° C. or higher, which indicated that the composition was preferable as a transparent resin for optical materials. The obtained molded product was dyed, and it was confirmed that the transmittance after dyeing at 565 nm was 33% T so that the dyeing properties were favorable, and the molded product was homogeneously dyed without uneven dyeing density. The evaluation results were described in [Table 1].

Example 7

A mixture (41.0 g) of 2,5-bis(isocyanatomethyl)-bicyclo [2.2.1]heptane and 2,6-bis(isocyanatomethyl)-bicyclo [2.2.1]heptane, pentaerythritol tetrakis(3-mercaptopropionate) (48.3 g), 4,4'-bicyclohexanone (10.7 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 43, a specific gravity of 1.28 and a thermal resistance of 90° C. or higher, which indicated that the composition was preferable as a transparent resin for optical materials. The obtained molded product was dyed, and it was confirmed that the transmittance after dyeing at 565 nm was 30% T so that the dyeing properties were favorable, and the molded product was homogeneously dyed without uneven dyeing density. The evaluation results were described in [Table 1].

Example 8

A mixture (42.7 g) of 2,5-bis(isocyanatomethyl)-bicyclo [2.2.1]heptane and 2,6-bis(isocyanatomethyl)-bicyclo [2.2.1]heptane, pentaerythritol tetrakis(3-mercaptopropionate) (50.3 g), 1,4-cyclohexanedione (7.0 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.57, an Abbe number (ve) of 43, a specific gravity of 1.30 and a thermal resistance of 90° C. or higher, which indicated that the composition was preferable as a transparent resin for optical materials. The obtained molded product was dyed, and it was confirmed that the transmittance after dyeing at 565 nm was 33% T so that the dyeing properties were favorable, and the molded product was homogeneously dyed without uneven dyeing density. The evaluation results were described in [Table 1].

Example 9

A mixture (25.5 g) of 2,5-bis(isocyanatomethyl)-bicyclo [2.2.1]heptane and 2,6-bis(isocyanatomethyl)-bicyclo [2.2.1]heptane, m-xylylene diisocyanate (16.5 g), pentaerythritol tetrakis(3-mercaptopropionate) (30.1 g), a mixture (16.1 g) of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane, camphor (11.8 g), dimethyltin dichloride (0.02 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.59, an Abbe number (ve) of 39, a specific gravity of 1.29 and a thermal resistance of 90° C. or higher, which indicated that the composition was preferable as a transparent resin for optical materials. The obtained molded product was dyed, and it was confirmed that the transmittance after dyeing at 565 nm was 40% T so that the dyeing properties were favorable, and the molded product was homogeneously dyed without uneven dyeing density. In addition, a three-point bending test was carried out on the obtained molded product, and the stiffness was 2300 N/mm$^2$. From comparison with following Comparative Example 2, it was confirmed that addition of a ketone compound improved the value by 9%. The evaluation results were described in [Table 1].

Example 10

Bis(4-isocyanate cyclohexyl)methane (50.8 g), 4-mercaptomethyl-1,8-dimercapto-3,6-dithiaoctane (33.7 g), camphor (15.4 g), dibutyltin dichloride (0.3 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.58, an Abbe number (ve) of 41, a specific gravity of 1.19 and a thermal resistance of 90° C. or higher, which indicated that the composition was preferable as a transparent resin for optical materials. The obtained molded product was dyed, and it was confirmed that the transmittance after dyeing at 565 nm was 40% T so that the dyeing properties were favorable, and the molded product was homogeneously dyed without uneven dyeing density. In addition, a three-point bending test was carried out on the obtained molded product, and the stiffness was 1780 N/mm$^2$. From comparison with following Comparative Example 3, it was confirmed that addition of a ketone compound improved the value by 11%. The evaluation results were described in [Table 1].

Example 11

A mixture (45.1 g) of 1,3-bis(isocyanatomethyl)cyclohexane and 1,4-bis(isocyanatomethyl)cyclohexane, pentaerythritol tetrakis(3-mercaptopropionate) (20.8 g), 4-mercaptomethyl-1,8-dimercapto-3,6-dithiaoctane (27.0 g), camphor (7.1 g), dimethyltin dichloride (0.05 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.59, an Abbe number (ve) of 40, a specific gravity of 1.26 and a thermal resistance of 90° C. or higher, which indicated that the composition was preferable as a transparent resin for optical materials. The obtained molded product was dyed, and it was confirmed that the transmittance after dyeing at 565 nm was 39% T so that the dyeing properties were favorable, and the molded product was homogeneously dyed without uneven dyeing density. In addition, a three-point bending test was carried out on the obtained molded product, and the stiffness was 1750 N/mm$^2$. From comparison with following Comparative Example 4, it was confirmed that addition of a ketone compound improved the value by 11%. The evaluation results were described in [Table 1].

Example 12

Isophorone diisocyanate (38.7 g), hexamethylene diisocyanate (0.6 g), pentaerythritol tetrakis(3-mercaptopropionate) (43.4 g), camphor (17.3 g), dimethyltin dichloride (0.2 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.54, an Abbe number (ve) of 44, a specific gravity of 1.20 and a thermal resistance of 90° C. or higher, which indicated that the composition was preferable as a transparent resin for optical materials. The obtained molded product was dyed, and it was confirmed that the transmittance after dyeing at 565 nm was 37% T so that the dyeing properties were favorable, and the molded product was homogeneously dyed without uneven dyeing density. In addition, a three-point bending test was carried out on the obtained molded product, and the stiffness was 2270 N/mm$^2$. From comparison with Comparative Example 7, it was confirmed that addition of a ketone compound improved the value by 14%. The evaluation results were described in [Table 1].

Example 13

Bis(4-isocyanate cyclohexyl)methane (45.0 g), pentaerythritol tetrakis(3-mercaptopropionate) (41.9 g), camphor (13.1 g), dimethyltin dichloride (0.25 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.55, an Abbe number (ve) of 44, a specific gravity of 1.20 and a thermal resistance of 90° C. or higher, which indicated that the composition was preferable as a transparent resin for optical materials. The obtained molded product was dyed, and it was confirmed that the transmittance after dyeing at 565 nm was 30% T so that the dyeing properties were favorable, and the molded product was homogeneously dyed without uneven dyeing density. In addition, a three-point bending test was carried out on the obtained molded product, and the stiffness was 1800 N/mm$^2$. From comparison with Comparative Example 8, it was confirmed that addition of a ketone compound improved the value by 30%. The evaluation results were described in [Table 1].

Example 14

A mixture (43.8 g) of 2,5-bis(isocyanatomethyl)-bicyclo[2.2.1]heptane and 2,6-bis(isocyanatomethyl)-bicyclo[2.2.1]heptane, pentaerythritol tetrakis(mercaptoacetate) (45.9 g), camphor (10.3 g), dimethyltin dichloride (0.1 g), an ultraviolet absorbent (1.5 g, manufactured by Kyodo Chemical Co., Ltd., product name: VIOSORB 583) and an internal mold release agent (0.005 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 43, a specific gravity of 1.30 and a thermal resistance of 90° C. or higher, which indicated that the composition was preferable as a transparent resin for optical materials. The obtained molded product was dyed, and it was confirmed that the transmittance after dyeing at 565 nm was 38% T so that the dyeing properties were favorable, and the molded product was homogeneously dyed without uneven dyeing density. The evaluation results were described in [Table 1].

Example 15

A mixture (42.4 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (49.2 g), ethylene glycol bis(3-mercaptopropionate) (1.0 g), camphor (7.5 g), dimethyltin dichloride (0.03 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 42, a specific gravity of 1.28 and a thermal resistance of 90° C. or higher, which indicated that the composition was preferable as a transparent resin for optical materials. The obtained molded product was dyed, and it was confirmed that the transmittance after dyeing at 565 nm was 29% T so that the dyeing properties were favorable, and the molded product was homogeneously dyed without uneven dyeing density. The evaluation results were described in [Table 1].

Example 16

A mixture (36.7 g) of 2,4-tolylene diisocyanate and 2,6-tolylene diisocyanate, a mixture (43.3 g) mainly including 1,1,3,3-tetrakis(mercaptomethylthio)propane and 4,6-bis(mercaptomethylthio)-1,3-dithiane and 2-(2,2-bis(mercaptomethylthio)ethyl)-1,3-dithietane, camphor (20.0 g), dimethyltin dichloride (0.01 g), an ultraviolet absorbent (1.5 g, manufactured by Kyodo Chemical Co., Ltd., product name: VIOSORB 583) and an internal mold release agent (0.10 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.66, an Abbe number (ve) of 27, a specific gravity of 1.32 and a thermal resistance of 90° C. or higher, which indicated that the composition was preferable as a transparent resin for optical materials. The obtained molded product was dyed, and it was confirmed that the transmittance after dyeing at 565 nm was 32% T so that the dyeing properties were favorable, and the molded product was homogeneously dyed without uneven dyeing density. The evaluation results were described in [Table 1].

Comparative Example 1

A mixture (45.9 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (54.1 g), dimethyltin dichloride (0.03 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.57, an Abbe number (ve) of 42, a specific gravity of 1.31 and a thermal resistance of 90° C. or higher, which indicated that the composition was preferable as a transparent resin for optical materials. The obtained molded product was dyed. The transmittance after dyeing at 565 nm was 60% T while the molded product was homogeneously dyed without uneven dyeing density. In addition, a three-point bending test was carried out on the obtained molded product, and it was confirmed that the stiffness was 2030 N/mm$^2$. The evaluation results were described in [Table 2].

Comparative Example 2

A mixture (28.9 g) of 2,5-bis(isocyanatomethyl)-bicyclo[2.2.1]heptane and 2,6-bis(isocyanatomethyl)-bicyclo[2.2.1]heptane, m-xylylene diisocyanate (18.8 g), pentaerythritol tetrakis(3-mercaptopropionate) (34.1 g), a mixture (18.2 g) of 5,7-dimercaptomethyl-1,11-dimercapto-3,6,9-trithiaundecane and 4,7-dimercaptomethyl-1,11-dimercapto-3,6,9-trithiaundecane and 4,8-dimercaptomethyl-1,11-dimercapto-3,6,9-trithiaundecane, dimethyltin dichloride (0.02 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.60, an Abbe number (ve) of 38, a specific gravity of 1.33 and a thermal resistance of 90° C. or higher, which indicated that the composition was preferable as a transparent resin for optical materials. The obtained molded product was dyed. The transmittance after dyeing at 565 nm was 68% T while the molded product was homogeneously dyed without uneven dyeing density. In addition, a three-point bending test was carried out on the obtained molded product, and it was confirmed that the stiffness was 2110 N/mm$^2$. The evaluation results were described in [Table 2].

Comparative Example 3

Bis(4-isocyanato cyclohexyl)methane (60.1 g), 4-mercaptomethyl-1,8-dimercapto-3,6-dithiaoctane (39.9 g), dibutyltin dichloride (0.3 g), an ultraviolet absorbent (1.5 g, manufactured by Kyodo Chemical Co., Ltd., product name: VIOSORB 583) and an internal mold release agent (0.12 g, manufactured by Mitsui Chemicals, Inc., product name: internal mold release agent for MR) were mixed and dissolved to produce a homogeneous solution. The mixed solution was degassed at 400 Pa over 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.60, an Abbe number (ve) of 39, a specific gravity of 1.23 and a thermal resistance of 90° C. or higher, which indicated that the composition was preferable as a transparent resin for optical materials. The obtained molded product was dyed. The transmittance after dyeing at 565 nm was 61% T while the molded product was homogeneously dyed without uneven dyeing density. In addition, a three-point bending test was carried out on the obtained molded product, and it was confirmed that the stiffness was 1600 N/mm$^2$. The evaluation results were described in [Table 2].

Comparative Example 4

A mixture (48.6 g) of 1,3-bis(isocyanatomethyl)cyclohexane and 1,4-bis(isocyanatomethyl)cyclohexane, pentaerythritol tetrakis(3-mercaptopropionate) (22.3 g), 4-mercaptomethyl-1,8-dimercapto-3,6-dithiaoctane (29.1 g), dimethyltin dichloride (0.05 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.60, an Abbe number (ve) of 40, a specific gravity of 1.29 and a thermal resistance of 90° C. or higher, which indicated that the composition was preferable as a transparent resin for optical materials. The obtained molded product was dyed. The transmittance after dyeing at 565 nm was 60% T while the molded product was homogeneously dyed without uneven dyeing density. In addition, a three-point bending test was carried out on the obtained molded product, and it was confirmed that the stiffness was 1580 N/mm$^2$. The evaluation results were described in [Table 2].

Comparative Example 5

A mixture (58.0 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (28.8 g), 2-mercapto ethanol (13.2 g), dimethyltin dichloride (0.05 g), an ultraviolet absorbent (1.5 g, manufactured by Kyodo Chemical Co., Ltd., product name: VIOSORB 583) and an internal mold release agent (0.12 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution.

After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.57, an Abbe number (ve) of 43, a specific gravity of 1.29 and a thermal resistance of 90° C. or higher, which indicated that the composition was preferable as a transparent resin for optical materials. The obtained molded product was dyed, and it was confirmed that the transmittance after dyeing at 565 nm was 37% T so that the dyeing properties were favorable, but the molded product was dyed in a mottled pattern such that the dyeing state was uneven. The evaluation results were described in [Table 2].

Comparative Example 6

A mixture (57.4 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (35.1 g), 1,4-butanediol (7.5 g), dibutyltin dichloride (0.05 g), an ultraviolet absorbent (1.5 g, manufactured by Kyodo Chemical Co., Ltd., product name: VIOSORB 583) and an internal mold release agent (0.25 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.60, an Abbe number (ve) of 41, a specific gravity of 1.28 and a thermal resistance of 90° C. or higher, which indicated that the composition was preferable as a transparent resin for optical materials. The obtained molded product was dyed, and it was confirmed that the transmittance after dyeing at 565 nm was 37% T so that the dyeing properties were favorable, but the molded product was dyed in a mottled pattern such that the dyeing state was uneven. The evaluation results were described in [Table 2].

Comparative Example 7

Isophorone diisocyanate (46.8 g), hexamethylene diisocyanate (0.7 g), pentaerythritol tetrakis(3-mercaptopropionate) (52.5 g), dimethyltin dichloride (0.2 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.55, an Abbe number (ve) of 42, a specific gravity of 1.24 and a thermal resistance of 90° C. or higher, which indicated that the composition was preferable as a transparent resin for optical materials. However, when the obtained molded product was dyed, it was confirmed that the transmittance after dyeing at 565 nm was 77% T such that the dyeing properties were poor, and the molded product had uneven dyeing density. In addition, a three-point bending test was carried out on the obtained molded product, and it was confirmed that the stiffness was 2000 N/mm². The evaluation results were described in [Table 2].

Comparative Example 8

Bis(4-isocyanate cyclohexyl)methane (51.8 g), pentaerythritol tetrakis(3-mercaptopropionate) (48.2 g), dimethyltin dichloride (0.25 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 µm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 43, a specific gravity of 1.24 and a thermal resistance of 90° C. or higher, which indicated that the composition was preferable as a transparent resin for optical materials. However, when the obtained molded product was dyed, it was confirmed that the transmittance after dyeing at 565 nm was 73% T such that the dyeing properties were poor, and the molded product had uneven dyeing density. In addition, a three-point bending test was carried out on the obtained molded product, and it was confirmed that the stiffness was 1390 N/mm². The evaluation results were described in [Table 2].

Comparative Example 9

A mixture (44.3 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (52.4 g), acetophenone (3.3 g), dimethyltin dichloride (0.03 g), an ultraviolet absorbent (1.5 g, manufactured by Kyodo Chemical Co., Ltd., product name: VIOSORB 583)

and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.57, an Abbe number (ve) of 41, a specific gravity of 1.29 and a thermal resistance of 90° C. or higher, which indicated that the composition was preferable as a transparent resin for optical materials. However, when the obtained molded product was dyed, it was confirmed that the transmittance after dyeing at 565 nm was 61% T such that the dyeing properties were poor, and the molded product was homogeneously dyed. The evaluation results were described in [Table 2].

Comparative Example 10

A mixture (41.2 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (48.8 g), thiocamphor (10.1 g), dichloride (0.03 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.57, an Abbe number (ve) of 42, a specific gravity of 1.29 and a thermal resistance of 90° C. or higher, but the molded product was poorly colored, and the composition was not preferable as a transparent resin for optical materials. The evaluation results were described in [Table 2].

Comparative Example 11

A mixture (43.7 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (51.8 g), cyclohexanecarboxyaldehyde (4.6 g), dimethyltin dichloride (0.03 g), an ultraviolet absorbent (1.5 g, manufactured by Kyodo Chemical Co., Ltd., product name: VIOSORB 583) and an internal mold release agent (0.08 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 42, a specific gravity of 1.29 and a thermal resistance of 90° C. or higher, which indicated that the composition was preferable as a transparent resin for optical materials. However, when the obtained molded product was dyed, it was confirmed that the transmittance after dyeing at 565 nm was 55% T, but the molded product had uneven dyeing density. The evaluation results were described in [Table 2].

Comparative Example 12

A mixture (41.1 g) of 2,5-bis(isocyanatomethyl)-bicyclo[2.2.1]heptane and 2,6-bis(isocyanatomethyl)-bicyclo[2.2.1]heptane, pentaerythritol tetrakis(3-mercaptopropionate) (48.7 g), 5-norbornene-2-carboxyaldehyde (10.2 g), dimethyltin dichloride (0.03 g), an ultraviolet absorbent (1.5 g, manufactured by Kyodo Chemical Co., Ltd., product name: VIOSORB 583) and an internal mold release agent (0.1 g, manufactured by Mitsui Chemicals, Inc., product name: internal mold release agent for MR) were mixed and dissolved to produce a homogeneous solution. The mixed solution was degassed at 400 Pa for 1 hour, then, filtered using a 1 μm PTFE filter, and injected into a mold composed of a glass mold and tape. The mold was put into a polymerization oven, and slowly heated from 25° C. to 120° C. for 21 hours so as to polymerize the solution. After the end of polymerization, the mold was removed from the oven. The mold release properties of a molded product made of a resin from the mold were favorable. The obtained molded product was further subjected to an annealing treatment at 120° C. for 2 hours. The obtained molded product was transparent, and had a refractive index (ne) of 1.56, an Abbe number (ve) of 42, a specific gravity of 1.29 and a thermal resistance of 90° C. or higher, but the molded product was poorly colored, and the composition was not preferable as a transparent resin for optical materials. The evaluation results were described in [Table 2].

TABLE 1

| | Component 1 | Component 2 | Component 3 | Amount of Ketone Compound (Parts by Weight)* | Refractive Index (ne) | Abbe Number (ve) | Specific Gravity | Mold Release Properties | Transparency | Thermal Resistance | Dyeing Properties (% T) | Dyeing Uniformity | Stiffness (N/mm$^2$) |
|---|---|---|---|---|---|---|---|---|---|---|---|---|---|
| Example 1 | i-1 | t-1 | k-1 | 6.0 | 1.56 | 43 | 1.29 | ○ | ○ | ○ | ○(38) | ○ | 2340 |
| Example 2 | i-1 | t-1 | k-2 | 5.3 | 1.56 | 43 | 1.29 | ○ | ○ | ○ | ○(40) | ○ | — |
| Example 3 | i-1 | t-1 | k-3 | 6.2 | 1.56 | 41 | 1.28 | ○ | ○ | ○ | ○(38) | ○ | — |
| Example 4 | i-1 | t-1 | k-4 | 9.4 | 1.57 | 43 | 1.29 | ○ | ○ | ○ | ○(31) | ○ | — |

TABLE 1-continued

| | Component 1 | Component 2 | Component 3 | Amount of Ketone Compound (Parts by Weight)* | Refractive Index (ne) | Abbe Number (ve) | Specific Gravity | Mold Release Properties | Transparency | Thermal Resistance | Dyeing Properties (% T) | Dyeing Uniformity | Stiffness (N/mm$^2$) |
|---|---|---|---|---|---|---|---|---|---|---|---|---|---|
| Example 5 | i-1 | t-1 | k-5 | 13.4 | 1.56 | 43 | 1.28 | ○ | ○ | ○ | ○(31) | ○ | — |
| Example 6 | i-1 | t-1 | k-6 | 16.9 | 1.56 | 44 | 1.25 | ○ | ○ | ○ | ○(33) | ○ | — |
| Example 7 | i-1 | t-1 | k-7 | 12.0 | 1.56 | 43 | 1.28 | ○ | ○ | ○ | ○(30) | ○ | — |
| Example 8 | i-1 | t-1 | k-8 | 7.5 | 1.57 | 43 | 1.30 | ○ | ○ | ○ | ○(33) | ○ | — |
| Example 9 | i-1 i-2 | t-1 t-2 | k-6 | 13.4 | 1.59 | 39 | 1.29 | ○ | ○ | ○ | ○(40) | ○ | 2300 |
| Example 10 | i-3 | t-3 | k-6 | 18.2 | 1.58 | 41 | 1.19 | ○ | ○ | ○ | ○(40) | ○ | 1780 |
| Example 11 | i-4 | t-1 t-3 | k-6 | 7.6 | 1.59 | 40 | 1.26 | ○ | ○ | ○ | ○(39) | ○ | 1750 |
| Example 12 | i-5 i-6 | t-1 | k-6 | 20.9 | 1.54 | 44 | 1.20 | ○ | ○ | ○ | ○(37) | ○ | 2270 |
| Example 13 | i-3 | t-1 | k-6 | 15.1 | 1.55 | 44 | 1.20 | ○ | ○ | ○ | ○(30) | ○ | 1800 |
| Example 14 | i-1 | t-4 | k-6 | 11.5 | 1.56 | 43 | 1.30 | ○ | ○ | ○ | ○(38) | ○ | — |
| Example 15 | i-1 | t-1 t-5 | k-6 | 8.1 | 1.56 | 42 | 1.28 | ○ | ○ | ○ | ○(29) | ○ | — |
| Example 16 | i-7 | t-6 | k-6 | 25.0 | 1.56 | 27 | 1.32 | ○ | ○ | ○ | ○(39) | ○ | — |

*Amount (Parts by Weight) of Ketone Compound with Respect to 100 Parts by Weight of Isocyanate Compound and Thiol Compound

TABLE 2

| | Component 1 | Component 2 | Component 3 | Refractive Index (ne) | Abbe Number (ve) | Specific Gravity | Mold Release Properties | Transparency | Thermal Resistance | Dyeing Properties (% T) | Dyeing Uniformity | Stiffness (N/mm$^2$) |
|---|---|---|---|---|---|---|---|---|---|---|---|---|
| Comparative Example 1 | i-1 | t-1 | — | 1.57 | 42 | 1.31 | ○ | ○ | ○ | x(60) | ○ | 2030 |
| Comparative Example 2 | i-1 i-2 | t-1 t-2 | — | 1.60 | 38 | 1.33 | ○ | ○ | ○ | x(68) | ○ | 2110 |
| Comparative Example 3 | i-3 | t-3 | — | 1.60 | 39 | 1.23 | ○ | ○ | ○ | x(61) | ○ | 1600 |
| Comparative Example 4 | i-4 | t-1 t-3 | — | 1.60 | 40 | 1.29 | ○ | ○ | ○ | x(60) | ○ | 1580 |
| Comparative Example 5 | i-1 | t-1 | a-1 | 1.57 | 43 | 1.29 | ○ | ○ | ○ | ○(37) | x | — |
| Comparative Example 6 | i-1 | t-1 | a-2 | 1.60 | 41 | 1.28 | ○ | ○ | ○ | ○(37) | x | — |
| Comparative Example 7 | i-5 i-6 | t-1 | — | 1.55 | 42 | 1.24 | ○ | ○ | ○ | x(77) | x | 2000 |
| Comparative Example 8 | i-3 | t-1 | — | 1.56 | 43 | 1.24 | ○ | ○ | ○ | x(73) | x | 1390 |
| Comparative Example 9 | i-1 | t-1 | k-9 | 1.57 | 41 | 1.29 | ○ | ○ | ○ | x(61) | x | — |
| Comparative Example 10 | i-1 | t-1 | k-10 | 1.57 | 42 | 1.29 | ○ | ○ | ○ | Not checked due to much coloring | | — |
| Comparative Example 11 | i-1 | t-1 | d-1 | 1.56 | 42 | 1.29 | ○ | ○ | ○ | —(55) | x | — |
| Comparative Example 12 | i-1 | t-1 | d-2 | 1.56 | 42 | 1.28 | ○ | ○ | ○ | Not checked due to much coloring | | — | i-1: a mixture of 2,5-bis(isocyanatomethyl)-bicyclo[2.2.1]heptane and 2,6-bis(isocyanatomethyl)-bicyclo[2.2.1]heptane
i-2: m-xylylene diisocyanate
i-3: bis(4-isocyanato cyclohexyl)methane
i-4: a mixture of 1,3-bis(isocyanatomethyl)cyclohexane and 1,4-bis(isocyanatomethyl)cyclohexane
i-5: isophorone diisocyanate
i-6: hexamethylene diisocyanate
i-7: a mixture of 2,4-tolylene diisocyanate and 2,6-tolylene diisocyanate
t-1: pentaerythritol tetrakis(3-mercaptopropionate)
t-2: a mixture of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane
t-3: 4-mercaptomethyl-1,8-dimercapto-3,6-dithiaoctane
t-4: pentaerythritol tetrakis(2-mercaptoacetate)
t-5: ethylene glycol bis(3-mercaptopropionate)
t-6: a mixture mainly including 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane
k-1: cyclohexanone
k-2: methyl isobutyl ketone
k-3: isophorone
k-4: tricycle[5.2.1.0$^{2,6}$]decan-8-one
k-5: 2-adamantanone
k-6: camphor
k-7: 4,4'-bicyclohexanone
k-8: 1,4-cyclohexanedione
k-9: acetophenone
k-10: thiocamphor
a-1: 2-mercapto ethanol
a-2: 1,4-butanediol
d-1: cyclohexanecarboxyaldehyde
d-2: 5-norbornene-2-carboxyaldehyde From the above results, it is found that, compared with Comparative Examples, the polymerizable composition of the present invention can improve dyeing properties without causing uneven dyeing density in molded products and produce molded products having an improved mechanical strength. In addition, in order to improve mold release properties from molds, it is possible to decrease the amount of an internal mold release agent being added.

Using the polymerizable composition of the present invention, resins or optical materials in which the occurrence of uneven dyeing density is suppressed so that the resins or optical materials are homogeneously dyed can be obtained, and optical materials in which mechanical properties are excellent can be obtained. In addition, optical materials obtained using the polymerizable composition of the present invention are excellent in terms of optical characteristics such as refractive index, mold release properties, transparency and heat resistance, and are also excellent in terms of balance among the above characteristics.

The polymerizable composition can be preferably used as resins for optical materials which require a high refractive index and a high transparency, and, in particular, as plastic lenses for eyeglasses.

The present application claims priority based on Japanese Patent Application no. 2011-139244, filed on Jun. 23, 2011, the contents of which are incorporated herein by reference.

The present invention includes the following embodiments.

[a] A polymerizable composition containing an aliphatic ketone compound including one or more carbonyl groups; at least one kind of isocyanate compounds; and at least one kind of thiol compounds.

[b] The polymerizable composition according to [a], in which the aliphatic ketone compound is represented by formula (1).

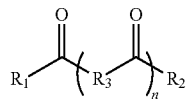

(1)

In the formula, each of $R_1$, $R_2$ and $R_3$ independently represents a linear, branched or cyclic aliphatic hydrocarbon group having 1 to 10 carbon atoms; $R_1$, $R_2$ and $R_3$ may bond together so as to configure a ring; n represents an integer of 0 or 1.

[c] The polymerizable composition according to [a] or [b], in which the aliphatic ketone compound is one or more compounds selected from 4-methyl-2-pentanone, cyclohexanone, isophorone, tricyclo[5.2.1.0$^{2,6}$]decan-8-one, 2-adamantanone, camphor, 4,4'-bicyclohexanone and cyclohexanedione.

[d] The polymerizable composition according to [a] or [b], in which the aliphatic ketone compound includes a 5-membered ring or 6-membered ring structure.

[e] The polymerizable composition according to [d], in which the aliphatic ketone compound includes a carbonyl group in the ring structure.

[f] The polymerizable composition according to any one of [a] to [e], in which the isocyanate compound is one or more compounds selected from m-xylylene diisocyanate, 2,4-tolylene diisocyanate, 2,6-tolylene diisocyanate, 4,4'-diphenyl methane diisocyanate, 2,5-bis(isocyanatomethyl)-bicyclo[2.2.1]heptane, 2,6-bis(isocyanatomethyl)-bicyclo[2.2.1]heptane, bis(4-isocyanato cyclohexyl)methane, 1,3-bis(isocyanatomethyl)cyclohexane, 1,4-bis(isocyanatomethyl)cyclohexane and hexamethylene diisocyanate, and the thiol compound is one or more compounds selected from pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-dimercaptomethyl-1,4-dithiane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane.

[g] A molded material comprised of a thio urethane resin obtained by heating and curing the polymerizable composition according to any one of [a] to [f].

[h] An optical material comprised of the molded material according to [g].

[i] A plastic lens comprised of the optical material according to [h].

[j] A method for manufacturing optical materials including a step of cast-polymerizing the polymerizable composition according to any one of [a] to [f].

[k] The method for manufacturing optical materials according to [j] further including a step of dyeing a molded product obtained through the cast polymerization.

The invention claimed is:

1. A polymerizable composition comprising:
a ketone compound including one or more carbonyl groups;
at least one isocyanate compound;
at least one thiol compound; and
wherein the ketone compound is one or more compounds selected from isophorone, tricyclo[5.2.1.0$^{2,6}$]decan-8-one, 2-adamantanone, camphor, 4,4'-bicyclohexanone or cyclohexanedione.

2. A polymerizable composition comprising:
a ketone compound including one or more carbonyl groups;
at least one isocyanate compound;
at least one thiol compound;
wherein the ketone compound is one or more compounds selected from, cyclohexanone, isophorone, tricyclo[5.2.1.0$^{2,6}$]decan-8-one, 2-adamantanone, camphor, 4,4'-bicyclohexanone or cyclohexanedione and wherein the ketone compound is included in 1 part by weight to 50 parts by weight with respect to a total of 100 parts by weight of the isocyanate compound and the thiol compound.

3. A polymerizable composition comprising:
a ketone compound including one or more carbonyl groups;
at least one isocyanate compound;
at least one thiol compound;
wherein the ketone compound is one or more compounds selected from, cyclohexanone, isophorone, tricyclo[5.2.1.0$^{2,6}$]decan-8-one, 2-adamantanone, camphor, 4,4'-bicyclohexanone or cyclohexanedione and wherein the isocyanate compound is one or more compounds selected from m-xylylene diisocyanate, 2,4-tolylene diisocyanate, 2,6-tolylene diisocyanate, 4,4'-diphenyl methane diisocyanate, 2,5-bis(isocyanatomethyl)-bicyclo[2.2.1]heptane, 2,6-bis(isocyanatomethyl)-bicyclo[2.2.1]heptane, bis(4-isocyanato cyclohexyl)methane, 1,3-bis(isocyanatomethyl)cyclohexane, 1,4-bis(isocyanatomethyl)cyclohexane, hexamethylene diisocyanate or isophorone diisocyanate, and the thiol compound is one or more compounds selected from pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, pentaerythritol tetrakis(2-mercaptoacetate) or ethylene glycol bis(3-mercaptopropionate).

4. A molded material comprised of a thio urethane resin obtained by heating and curing a polymerizable composition comprising:
 a ketone compound including one or more carbonyl groups;
 at least one isocyanate compound;
 at least one thiol compound; and
wherein the ketone compound is one or more compounds selected from, cyclohexanone, isophorone, tricyclo[5.2.1.0$^{2,6}$]decan-8-one, 2-adamantanone, camphor, 4,4'-bicyclohexanone or cyclohexanedione.

5. An optical material comprised of the molded material according to claim 4.

6. A plastic lens comprised of the optical material according to claim 5.

7. A method for manufacturing optical materials comprising: cast-polymerizing a polymerizable composition comprising:
 a ketone compound including one or more carbonyl groups;
 at least one isocyanate compound;
 at least one thiol compound; and
 wherein the ketone compound is one or more compounds selected from, cyclohexanone, isophorone, tricyclo [5.2.1.0$^{2,6}$]decan-8-one, 2-adamantanone, camphor, 4,4'-bicyclohexanone or cyclohexanedione.

8. The method for manufacturing optical materials according to claim 7, further comprising:
 dyeing a molded product obtained through the cast polymerization.

* * * * *